2,911,429

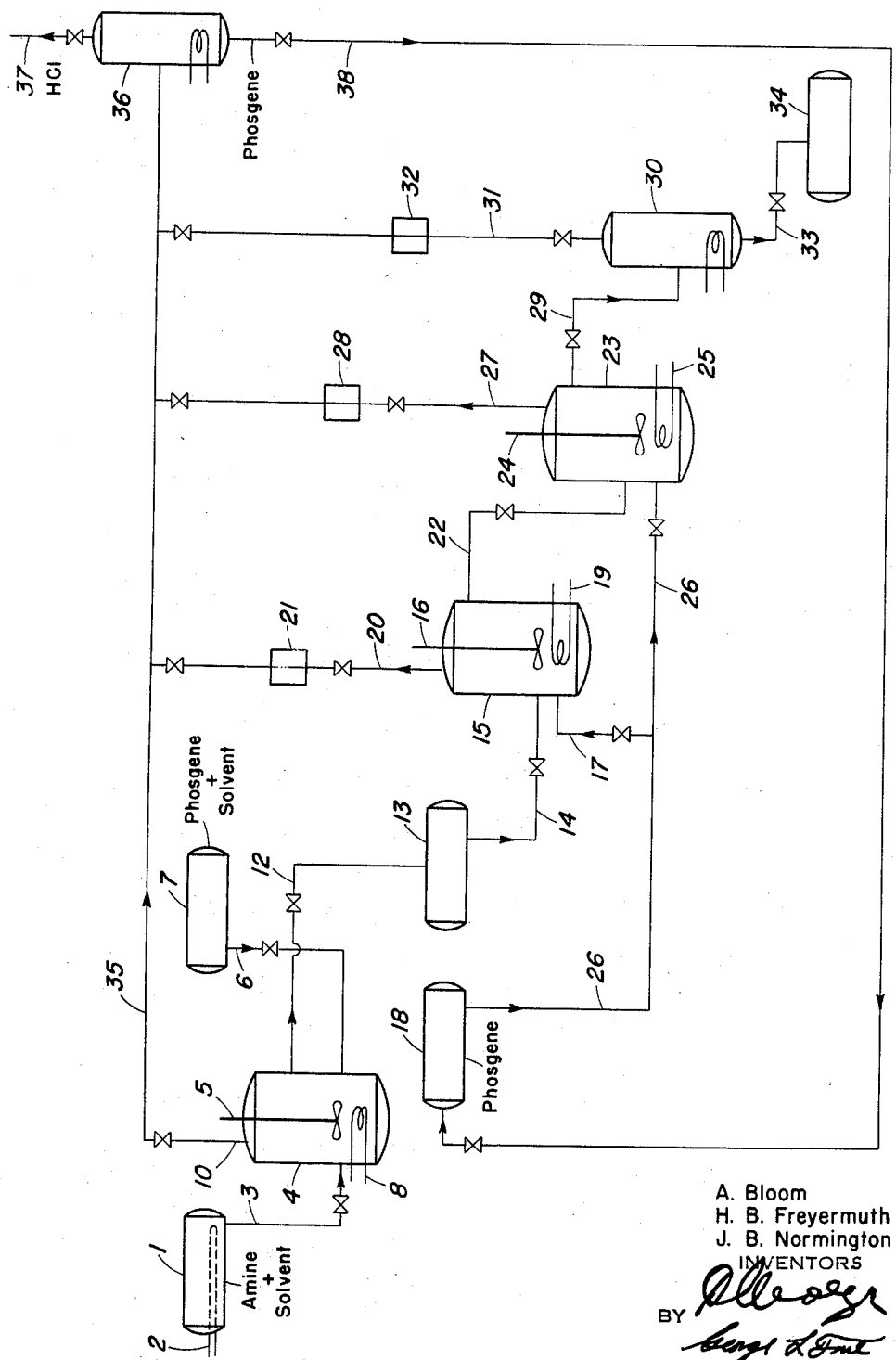

PROCESS FOR THE PREPARATION OF ISOCYANATES

Albert Bloom, Summit, N.J., Harlan B. Freyermuth, Easton, Pa., and James B. Normington, Little Silver, N.J., assignors to General Aniline & Film Corporation, New York, N.Y., a corporation of Delaware Application July 9, 1956, Serial No. 596,648

8 Claims. (Cl. 260—453)

This invention relates to a novel method for preparing organic isocyanates, and is applicable to the production of alkyl, cycloalkyl, alkaryl, aralkyl, aryl, hydroaryl, heterocyclic, mono-, di-, and polyisocyanates. More specifically, it is directed to an improved method of preparing organic isocyanates by reaction of a primary amine with phosgene in liquid phase, and in solution in dialkyl ketone.

Isocyanates find extensive use in industry, as chemical intermediates, and more particularly in the case of polyisocyanates, and, especially, aromatic diisocyanates, in the manufacture of rubber and rubber-like materials, adhesive coating agents, insulating agents, and a wide variety of other synthetic plastic materials. Isocyanates are readily prepared from the amines, corresponding to the isocyanate desired, by treatment with phosgene. Due to the tendency of amines to form ureas on reaction with phosgene, especially at the temperatures used for the production of the isocyanates, the usual methods for producing isocyanates from the corresponding amines are as follows: a salt of the amine with a volatile acid, e.g., the carbonate or the hydrochloride of the amine, corresponding to the isocyanate desired, is first prepared and this salt is then reacted with phosgene to form the isocyanate, or, alternatively, the free amine may first be treated with phosgene—preferably at a low temperature to form an intermediate reaction product, which is believed to be a mixture of carbamyl chloride and hydrochloride; and this intermediate reaction product is then subjected to further treatment with phosgene, preferably at an elevated tempertture, in order to produce the desired isocyanate. This method of synthesis of isocyanates, by reaction of the free amine with phosgene, may be illustrated by the production of toluylenediisocyanate from toluene diamines. In this synthesis, a tolylene diamine is dissolved in a solvent, such as ortho dichlorobenzene and treated with phosgene at a low temperature, preferably of 0 to 5° C. This gives rise to a mixture in which the main component, quite probably, is the carbamyl chloride-hydrochloride

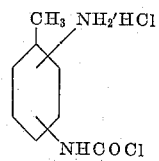

although it is probable that some of the dicarbamyl chloride

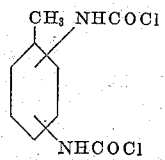

and the dihydrochloride

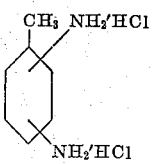

are also formed. However, since these will also react with phosgene to form the isocyanate, and since the dihydrochloride and the dicarbamyl chloride are formed in the same proportions, as though a single product, the carbamyl chloride-hydrochloride, were formed, the overall reaction of the toluene diamine with phosgene, at a low temperature, may be formulated conveniently, as indicated by reaction #1.

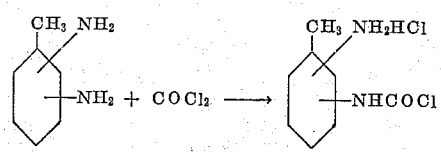

Reaction #1

This carbamyl chloride-hydrochloride is an insoluble material and when the reaction mixture is heated up remains insoluble. By insoluble we do not mean that there is a complete absence of solubility, but rather that there is limited solubility. Now the reaction mixture is further treated with phosgene at an elevated temperature, preferably at about 140–160° C., and the carbamyl chloride-hydrochloride is then converted to the diisocyanate, as shown by reaction #2.

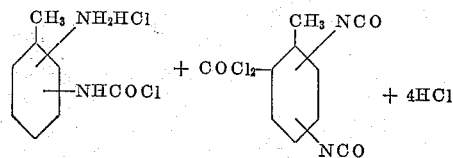

Reaction #2

The finished reaction mixture, after degassing, is fractionated to remove the solvent and separate the pure diisocyanate. This leaves a considerable residue of polymers and by-product in the still pot. This residue is removed from the still pot and, on treatment with caustic, there is recovered a quantity of tolylene diamine. The higher the amount of residue, the lower the yield of toluene diisocyanate. It has been shown, for example, that, by prolonging the distillation time, by-products or polymers are produced. To overcome this prolonged reaction time, it has been proposed that the phosgenation step be conducted at super-atmospheric pressures. For example, in U.S. Patent 2,642,449 the inventor claims that the reaction time can be reduced from 20 to 40 hours to as low as several minutes by conducting the phosgenation at super-atmospheric pressures. Since there is an inherent danger in handling phosgene under pressure, at high temperatures, it was therefore, desirable that a process for the manufacture of isocyanates, in which the reaction rate was fast and the yield high, be conducted at atmospheric pressure.

As indicated above, the prior art has commonly carried out the synthesis of diisocyanates from the amine or amine hydrochloride, by effecting the reaction in an inert solvent. The following solvents or suspending agents have been disclosed in the patent and chemical literature. U.S. 2,261,156, toluene; U.S. 2,659,861, xylene; U.S. 2,643,264, chlorobenzene, orthodichlorobenzene, toluene, xylene and tetrahydronaphthalene; U.S. 2,642,449, benzene, chlorobenzene, toluene, and chlortoluenes; U.S. 2,362,648, toluene; U.S. 2,683,160, chlorinated aromatic hydrocarbons; U.S. 2,680,130, benzene, chlorbenzene, dichlorbenzene, toluene, xylene, nitrobenzene, cyclohexane, kerosene, carbontetrachloride, tetrachlorethylene, trichlorethylene, trichlorbenzene, decahydronaphthalene, tetrahydronaphthalene, amylbenzene, ortho, meta and paracymenes, dodecylbenzene, naphthalene, heptylcyclopentane, diphenyl and partially hydrogenated aromatic hydrocarbons, boiling above 340° C.; U.S. 2,680,129, halogenated organic solvents boiling at about 275–400° C., such as chlorinated diphenyls; U.S. 2,340,757, xylene; U.S. 2,640,068, toluene and heptane; U.S. 2,374,340, decahydronaphthalene, amylbenzene, tetrahydronaphthalene and cymene; U.S. 2,326,501, chlorbenzene, toluene and trichlorobenzene; U.S. 2,683,727 and U.S. 2,683,729, both disclosed toluene; U.S. 2,625,561, dioxane, dibutyl ether, benzene and toluene are disclosed.

However, while numerous solvents have heretofore been suggested for use in the synthesis of organic isocyanates, they are subject to the objection that, due at least in part, to the relative insolubility of the amine hydrochloride, or carbamyl chloride therein, an extremely prolonged reaction time is required, which results in formation of substantial amounts of by-products and polymers; thus, adversely affecting the yield of desired isocyanates.

It is the object of this invention to disclose a process for the manufacture of isocyanates by an economic, technically feasible method, giving a high yield of pure isocyanate in a relatively short time. It is a further object of this invention to disclose that the above-mentioned process can be conducted in a continuous manner.

We have found that, in the production of isocyanates by the reaction of phosgene on an amine, while using, as the solvent for the reaction, a dialkyl ketone of the formula

wherein R and R', each, represent an alkyl group of 1 to 8 carbon atoms, and which is a liquid at a temperature between about 25 and 100° C. and, more preferably, between about 0° C. and at least 150° C., as, for example, diisobutyl ketone, methylisobutyl ketone, methylhexyl ketone, diisopropyl ketone, etc., we are able to obtain a high yield of pure isocyanate in a relatively short time.

The characteristics of this process are such that it lends itself to continuous operation, and the single figure of the attached drawing is a flow chart of a preferred equipment for practising the present invention in a continuous manner.

The above-mentioned dialkyl ketones have the following favorable characteristics:

(1) Good solvents for phosgene
(2) Good solvents for amines
(3) Produce a finely dispersed carbamyl chloride slurry The process of the present invention has been found to be of particular interest, and particularly valuable for the production of aromatic diisocyanates by the reaction of phosgene, with an aromatic diamine in solution in a dialkyl ketone of the type mentioned above. However, it should be understood that the process is equally applicable to the production of organic isocyanates generally; i.e aliphatic, cycloaliphatic, alkaryl, aralkyl, heterocyclic and aryl mono-, di- and polyisocyanates. Illustrative examples of these isocyanates, which may be prepared in accordance with the process of the present invention, by reaction of phosgene with the corresponding amine, are hexyl isocyanate from hexylamine, octyl isocyanate from octylamine, dodecyl isocyanate from dodecylamine, octadecyl isocyanate from octadecylamine, tetramethylene diisocyanate from tetramethylenediamine, pentamethylene diisocyanate from pentamethylenediamine, octamethylene diisocyanate from octamethylenediamine, undecamethylene diisocyanate from undecamethylenediamine, dodecamethylene diisocyanate from dodecamethylenediamine, 3,3'-diisocyanate dipropylether from 3,3'-diaminodipropylether, etc.; cyclohexyl isocyanate from cyclohexylamine, tetrahydro-a-naphthyl isocyanate from tetrahydro-a-naphthylamine, tetrahydro-b-naphthyl isocyanate from tetrahydro-b-naphthylamine, etc.; xylylene diisocyanates and xylylenediamines, diphenylmethane 4,4'-diisocyanate from 4,4'-diaminodiphenylmethane, b,b'-diphenylpropane 4,4'-diisocyanate from 4,4'-diamino-b-b-diphenylpropane, etc.; benzyl isocyanate, from benzylamine, phenylethyl isocyanate from phenylethyl amine; p-isocyanato benzyl isocyanate from p-amino-benzylamine, etc.; phenyl isocyanate from aniline, p-cetyl phenyl isocyanate from p-cetylaniline; p-dodecyl phenyl isocyanate from p-dodecylaniline, 5-dodecyl-2-methylphenyl isocyanate from 5-dodecyl-o-toluidine, 3-nitro-4-dodecyl phenylisocyanate from 3-nitro-4-dodecyl aniline; p-cetyloxyphenyl isocyanate from p-cetyloxyaniline; metaphenylene diisocyanate from metaphenylenediamine, p-phenylene diisocyanate from p-phenylenediamine, 1-methyl phenylene-2,4-diisocyanate from 1-methyl phenylene-2,4-diamine, naphthylene 1,4-diisocyanate from 1,4-naphthylenediamine, 2,6-tolylene diisocyanate from 2,6-toluenediamine, 1,3,5-benzene triisocyanate from 1,3,5-benzene triamine, etc.; tetrahydrofurfuryl isocyanate from tetrahydrofurfurylamine, etc.

The details of the present invention will be apparent to those skilled in the art from consideration of the following specific examples:

EXAMPLE 1

Into a 500 cc., 4-neck flask were charged 150 grams diisobutyl ketone. This solvent was cooled and stirred to 0–10° C. and 35 grams of phosgene were passed in at this temperature. 30 grams of a mixture of 2,4- and 2,6-tolylene diamine were dissolved in 50 grams of diisobutyl ketone by heating to 100° C. This hot solution was then added dropwise to the phosgene solution at 0–10° C. over about 10 minutes. A fine slurry resulted. This mixture was stirred and heated to 100–165° C. over a period of about 1½ hours, while passing phosgene gas through the mixture at a rate of approximately 1 gram per minute. After solution was complete, the phosgenation was continued for a short additional time. At this time, the solution was cooled to 100° C. and degassed with dry nitrogen until free of volatile acids. The weight of the crude material amounted to 237 grams, analyzing 99% as isocyanate. From this crude material, a mixture of 2,4- and 2,6-tolylene dissocyanates were isolated by fractional distillation.

Two specific mixtures of 2,4- and 2,6-tolylene diamine have been used in operating in accordance with the foregoing example. One of these mixtures consisted of about 80% 2,4-tolylenediamine and 20% 2,6-tolylene diamine, obtained by mono-nitrating toluene, whereby there was obtained a mixture of 2-nitrotoluene and 4-nitrotoluene, which mixture was then further nitrated without separation of these isomers to produce a mixture 2,4-dinitro toluene and 2,6-dinitro toluene, which was then reduced to give the above 80:20 mixture of 2,4- and 2,6-tolylene diamines. The other mixture consisted of about 65% 2,4-tolylene diamine and 35% tolylene diamine, obtained by mono-nitrating toluene and separating the thus produced 2-nitro-toluene from the 4-nitro toluene, followed by further nitration of the 2-nitro toluene to produce a mixture of 2,4-dinitro toluene and 2,6-dinitro toluene, which was then reduced to give the 65:35 mixture of the 2,4- and 2,6-tolylene diamines. The yield of tolylene diisocyanate was the same in both instances, the only difference being the ratio of the 2,4- and 2,6-isomers. Pure 2,4-tolylene diisocyanate was also produced in the same manner, and yield, by using pure 2,4-tolylene diamine in place of the mixture of isomeric tolylene diamines. The pure 2,4-tolylene diamine had been prepared by mononitrating toluene, followed by separation of the thus produced 2-nitro toluene from 4-nitro toluene, followed by further nitration of the thus recovered 4-nitro toluene to produce pure 2,4-dinitro toluene, which was then reduced to give pure 2,4-tolylene diamine.

Other aromatic polyisocyanates have also been produced in good yield and high purity, following the procedure outline above. Since the only change necessary in the procedure already described is the use, in place of 122 grams (1 mole) of the tolylene diamines, of an equivalent amount (1 mole) of the aromatic diamine corresponding to the diisocyanate desired, examples of aromatic diamines which, when treated in the manner described above and converted to diisocyanates of high purity and in good yield, are given below in tabular form.

*Table I*

| Aromatic Diamine | Amount of Diamine used (grams) | Diisocyanate Obtained |
|---|---|---|
| metaphenylene diamine | 108 | m-phenylene diisocyanate. |
| paraphenylene diamine | 108 | p-phenylene diisocyanate. |
| benzidine | 184 | 4,4'-di-isocyanatodiphenyl. |
| o-tolidine | 212 | 3,3'-dimethyl-4,4'-diisocyanato diphenyl. |
| dianisidine | 244 | 3,3'-dimethoxy-4,4'-diisocyanato diphenyl. |

EXAMPLE 2

The procedure of Example 1 was repeated, except that 214 grams of benzylamine were used in place of the 122 grams of the mixed 2,4- and 2,6-tolylenediamines. There was thus obtained benzyl isocyanate in a yield of about 85% of theory, and having a purity of 99% isocyanate.

In the production of aromatic isocyanates by the process of the present invention it is preferred to start with the free amine and react this with phosgene at a low temperature to form the carbamyl chloridehydrochloride which is then converted to the isocyanate by reaction with further amounts of phosgene at an elevated temperature in the manner described in the foregoing examples. However, if desired, the amine to be converted to the isocyanate may first be converted to its salt with a volatile acid (e.g., to the carbonate or hydrochloride) and the amine salt reacted with phosgene at an elevated temperature to obtain the desired isocyanate. This latter method is usually preferred for the production of alkyl isocyanates from the corresponding alkyl amines and is illustrated by the following example of the production of hexamethylene diisocyanate from hexamethylene diamine.

EXAMPLE 3

Into a 2-liter, 4-neck flask pass 100 parts of carbon dioxide into a cooled (0–10° C.) solution of 116 parts of hexamethylenediamine in 812 parts of diisobutyl ketone with rapid agitation. Heat the carbonate slurry of hexamethylenediamine and diisobutyl ketone to 160–165° C., while passing in phosgene over a period of 1 to 2 hours. There is thus produced a solution of hexamethylene diisocyanate in diisobutyl ketone, which was further processed as in Example 1. There was then obtained hexamethylene diisocyanate in a yield of about 90% of theory, and having a purity of 99% diisocyanate.

The foregoing examples are illustrative of preferred methods of producing isocyanates by the process of the present invention, and those skilled in the art can readily make such modifications as may be necessary to adapt the present process to the production of a particular isocyanate. As an illustration of the type of change which may be desirable in producing a particular isocyanate, may be mentioned, the production of triphenylmethane-4,4',4''-triisocyanate from 4,4',4''-triaminotriphenylmethane where, due to the somewhat lower solubility of the carbamyl chloride and hydrochloride, it is preferable to use a greater proportion of solvent as illustrated by the following example.

EXAMPLE 4

A cooled solution of phosgene in diisobutyl ketone was prepared in a 2-liter, 4-neck flask by passing 95 grams of phosgene into 609 grams of diisobutyl ketone in the flask, while stirring and cooling to 0–10° C. 193 grams of 4,4',4''-triaminotriphenylmethane were dissolved in 603 grams of diisobutyl ketone by heating to 100° C. This hot solution was then added, dropwise, to the phosgene solution at 0–10° C. over about 20 minutes. The resulting fine slurry was stirred and heated to 100–165° C. over a period of about ½ hour, while passing phosgene gas through the mixture at a rate of approximately 1 gram per minute. After solution was complete, the phosgenation was then degassed with dry nitrogen, until free of volatile acids. The thus produced triphenylmethane 4,4',4''-triisocyanate was recovered by distilling off the solvent, diisobutyl ketone, under vacuum.

As previously indicated, the process of the present invention is readily conducted in a continuous manner, and reference should now be made to the accompanying drawings, in which the single figure is a flow chart of a preferred form of apparatus suitable for use when the process of the present invention is to be operated in a continuous manner. The details of the continuous operation of the process of this invention will be apparent from the following description of the production of a mixture of isomeric tolylene diisocyanates from a mixture of isomeric tolylene diamines, using diisobutyl ketone as the solvent and using the apparatus illustrated in the drawings.

In the drawing, 1 represents a storage tank for a solution of the amine (e.g., mixed isomeric tolylene diamines) to be converted to isocyanate (e.g., mixed isomeric tolylene diisocyanates) in solvent (e.g., diisobutyl ketone) to be employed for the reaction. Heating means, such as steam coil 2, may be provided in this tank to maintain a sufficiently elevated temperature about 100° C., so that the amine is completely dissolved in the solvent. From storage tank 1, the solution of amine in solvent (about 60 parts by weight of tolylene diamines in 100 parts diisobutyl ketone) is continuously fed through valved line 3, into reaction vessel 4, equipped with suitable agitating means, such as stirrer 5. In reaction vessel 4, the solution of amine in solvent, which may be at a temperature of about 100° C., is introduced into a bath of phosgene in the same solvent (about 60 parts by weight of phosgene in 300 parts of diisobutyl ketone), at a low temperature, preferably 0–10° C.; the solution of phosgene in solvent being introduced continuously into the reaction vessel 4, through valved line 6, from storage tank 7. Suitable temperature control means, such as cooling coil 8, may be supplied in reaction vessel 4, in order to maintain the temperature of the reaction mass within the desired range.

The rate of feed of the phosgene solution and the tolylene diamine solution to reactor 4 are adjusted so that an excess of phosgene over that theoretically required to form the carbamyl chloride-hydrochloride is furnished, about 1.1 to 1.4 moles of phosgene being supplied per mole of diamine. In reaction vessel 4, the amine and phosgene react at low temperature to form the carbamyl chloride-hydrochloride, as indicated in reaction 1, above. Reaction vessel 4 is preferably maintained at atmospheric pressure, and, for safety, may be vented through valved line 10.

The slurry of carbamyl chloride-hydrochloride in diisobutyl ketone, formed in reactor 4, is drawn therefrom through valved line 12, to storage or surge tank 13, and is withdrawn therefrom through valved line 14, and introduced into reaction vessel 15, equipped with suitable agitating means, such as stirrer 16.

In reaction vessel 15, phosgene, preferably an excess over that theoretically required for the conversion of the carbamyl chloride-hydrochloride to the diisocyanate (e.g. about 1 to 3 moles of phosgene per mole of carbamyl chloride-hydrochloride) is introduced through valved line 17, from storage tank 18. The reaction mixture in reaction vessel 15 is heated to desired temperature (e.g. 100–160° C.) by suitable means, such as steam-heating coil 19. The reaction vessel 15 is preferably maintained at atmospheric pressure, and HCl formed therein and unreacted phosgene may be withdrawn therefrom through valved line 20, having condenser 21 therein. The residence time in vessel 15 may be about ½ hour to 1 hour. The product is withdrawn from reaction vessel 15, through valved line 22, and introduced into second reaction vessel 23, equipped with suitable agitating means, such as stirrer 24, and heating means, such as steam coil 25. Further phosgene (about 0.1 to 0.5 mole of phosgene per mole of carbamyl chloride-hydrochloride and diisocyanate, calculated as diamine supplied to reactor 23) is continuously introduced into reaction vessel 23, through valved line 26, from storage tank 18. HCl and phosgene may be removed from reactor vessel 23 through valved line 27, having condenser 28 therein; and the product consisting essentially of the desired isocyanate in solvent may be removed from reaction vessel 23, through valved line 29, degassing still 30. Gases, mostly HCl and phosgene are removed overhead from still 30, through valved line 31, having reflux condenser 32 therein. The solution of mixed tolylene diisocyanates in diisobutyl ketone are removed from still 30, through valved line 33 and collected in storage or surge tank 34.

Gases withdrawn from the reactors 15 and 23, and degassing still 30 through lines 20 and 27, respectively, and manifold 35, are introduced into suitable recovery means, such as still 36, from which HCl and other gaseous impurities may be withdrawn through valved line 37, and phosgene withdrawn through valved line 38 and returned to phosgene storage tank 18.

The product in storage tank 34 may be worked up in any suitable manner.

While the present invention has thus far been specifically described in connection with the use of diisobutyl ketone, as the dialkyl ketone employed as solvent for the reaction, it will be apparent, as previously indicated, that, in place of diisobutyl ketone, other dialkyl ketones of the general formula given above may be employed with substantially equivalent results. In selecting the particular dialkyl ketone to be employed as solvent for the reaction, the principal consideration involved is that it have the general formula given above, and that it be a liquid under the conditions at which it is used; i.e., its melting point should be such that it is a liquid at the temperature employed when first reacting the free amine with the phosgene, and its boiling point should be such that, once the intermediate carbamyl chloride-hydrochloride of the amine has been formed, the reaction with further amounts of phosgene can be carried out at slightly elevated temperature—e.g., 100° C., or slightly higher, preferably 150–160° C., without the necessity for resorting to the use of pressure in maintaining the solvent in liquid phase. As a practical matter, therefore, the particular dialkyl ketone employed as a solvent should have a melting point not much higher than room temperature, and, preferably, should have a melting point below 10° C. However, it will be apparent that, in the preferred conditions for practising the present invention, a solution of phosgene in an dialkyl ketone is prepared at 0 to 10° C., and a solution of the amine to be converted to the isocyanate is prepared by heating the amine and the dialkyl ketone to about 100° C. Since this solution of amine in the solvent is added hot to the cold solution of phosgene, a higher melting dialkyl ketone may be employed as the solvent for the amine, and a lower melting dialkyl ketone employed as the solvent for the phosgene, as, on mixing, there will be produced a low melting mixture of ketones which will be liquid at the 0 to 10° C. temperature used for the preparation of the intermediate carbamyl chloride-hydrochloride.

Since one of the advantages of the present invention is that the reaction may be carried out in relatively short time, at atmospheric pressure, it is preferable that the dialkyl ketone employed as a solvent have a boiling point, at atmospheric pressure, above the highest temperature used in the reaction (e.g., 150 to 160° C., used in the specific examples). However, by using very thorough mixing, and/or allowing longer reaction times, the reaction of the intermediate carbamyl chloride-hydrochloride with phosgene for the production of the isocyanate can be effected at temperatures in the order of 100° C. Thus, the minimum desirable boiling point of the dialkyl ketone, or mixture of ketones, used as the solvent is about 100° C., with a preferred minimum boiling point of 150–160° C. for the dialkyl ketone, employed.

It will also be appreciated that many of the dialkyl ketones crystalize very slowly on cooling below their melting point; and, thus, it is frequently possible to employ a dialkyl ketone having a melting point at room temperature, or higher, but which remains liquid for a substantial period of time at a temperature in the range of 0 to 10° C., so that the ketone may be melted and cooled at 0 to 10° C., and, at this temperature, phosgene may be introduced there into, to form a solution of phosgene in the ketone, which will remain liquid for several hours, or sufficiently long, so that the preparation of the carbamyl chloride-hydrochloride can conveniently be carried out.

With the foregoing considerations in mind, it will be apparent that a preferred solvent for the present invention is diisobutyl ketone, used in the foregoing examples, since this is readily available, and economically attractive. Other dialkyl ketones, which would be preferred, so far as operability is concerned, although economically they may be somewhat less attractive, include 2-octanone- (hexylmethyl ketone), 2-nonanone (heptylmethyl ketone), 3-nonanone (ethylhexyl ketone), 5-nonanone (dibutyl ketone), 4-decanone (hexylpropyl ketone), 3-hendecanone (ethyloctyl ketone), ethyl isoamyl ketone, and isobutyl propyl ketone. However, such dialkyl ketones as methylethyl ketone, which has a boiling point of 79.6° C., or isopropyl methyl ketone, which has a boiling point of 93° C., are removed from consideration as solvents for the use of the present invention by their relatively low boiling points, unless mixed with other higher boiling ketones to produce a higher boiling mixture. Such relatively low boiling ketones as 4-methylisobutyl ketone (B.P. 119), diisopropyl ketone (B.P. 123.7), butylmethyl ketone (B.P. 127.2), diethyl ketone (B.P. 102.7), tert. butyl methyl ketone (B.P. 106.2), ethyl propyl ketone (B.P. 124), ethyl isopropyl ketone (B.P. 136), isoamyl methyl ketone (B.P. 144), amylmethyl ketone (B.P. 150), ethylbutyl ketone (B.P.148–5), and dipropyl ketone (B.P. 144), while less preferred, are, nevertheless, operable.

We claim:

1. In the process for the preparation of isocyanates, wherein a slurry in an inert organic solvent having a boiling point below the boiling point of the isocyanate being prepared of a compound selected from the group consisting of organic amine salts with a volatile acid and an organic amine carbamyl chloride-hydrochloride is treated at an elevated temperature in the range of about 100–200° C., with phosgene, whereby the isocyanate is formed; the improvement which comprises employing as the inert organic solvent in said reaction a dialkyl ketone having a boiling point of at least 100° C. and having the formula

wherein R and R′, each, represent an alkyl group of 1 to 8 carbon atoms.

2. The process as defined in claim 1, wherein the dialkyl ketone specified is diisobutyl ketone.

3. In the process for the preparation of isocyanates, wherein an organic amino compound is reacted with phosgene at a low temperature and in an inert organic solvent having a boiling point below the boiling point of the isocyanate being prepared to produce a slurry of a carbamyl chloride-hydrochloride in said solvent, and the thus-obtained slurry is reacted at an elevated temperature in the range of about 100 to 200° C., with further phosgene, whereby there is produced the organic isocyanate corresponding to the amino compound used, and the thus-obtained isocyanate is recovered; the improvement which comprises employing, as the inert organic solvent, in said reaction, a dialkyl ketone having a boiling point of at least 100° C. and having the formula

wherein R and R', each, represent an alkyl group of 1 to 8 carbon atoms.

4. The process as defined in claim 3, wherein the inert solvent specified is diisobutyl ketone.

5. The process as defined in claim 3, wherein the organic amino compound specified is an aromatic diamine, whereby the organic isocyanate recovered is an aromatic diisocyanate.

6. The process as defined in claim 5, wherein the inert solvent specified is diisobutyl ketone.

7. The process as defined in claim 5, wherein the aromatic diamine specified is a toluene diamine, whereby the aromatic isocyanate recovered is tolylene diisocyanate.

8. The process as defined in claim 7, wherein the inert organic solvent specified is diisobutyl ketone.

References Cited in the file of this patent

UNITED STATES PATENTS

| | | |
|---|---|---|
| 2,640,068 | Schaefer et al. | May 26, 1953 |
| 2,680,130 | Flores | June 1, 1954 |
| 2,757,185 | Barthel | July 31, 1956 |